(12) United States Patent
Suga

(10) Patent No.: US 8,474,904 B2
(45) Date of Patent: Jul. 2, 2013

(54) PASSENGER COMPARTMENT MATERIAL STRUCTURE

(75) Inventor: Hitoshi Suga, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/263,100

(22) PCT Filed: Apr. 7, 2009

(86) PCT No.: PCT/JP2009/057144
§ 371 (c)(1),
(2), (4) Date: Oct. 6, 2011

(87) PCT Pub. No.: WO2010/116495
PCT Pub. Date: Oct. 14, 2010

(65) Prior Publication Data
US 2012/0025567 A1    Feb. 2, 2012

(51) Int. Cl.
*B62D 25/04* (2006.01)
(52) U.S. Cl.
USPC ............... 296/193.06; 296/214; 296/39.1; 296/213
(58) Field of Classification Search
USPC .............. 296/39.1, 213, 214, 203.01, 203.03, 296/193.06
See application file for complete search history.

(56) References Cited

U.S. PATENT DOCUMENTS

| | | | | |
|---|---|---|---|---|
| 6,517,144 B2 * | 2/2003 | Kobayashi | ............... | 296/187.05 |
| 6,832,810 B2 * | 12/2004 | Byma et al. | ............... | 296/214 |
| 6,887,552 B2 * | 5/2005 | Dykman et al. | ............... | 428/116 |
| 7,309,521 B2 * | 12/2007 | Brown | ............... | 428/223 |

FOREIGN PATENT DOCUMENTS

| | | |
|---|---|---|
| JP | 61 207248 | 9/1986 |
| JP | 4 1056 | 1/1992 |
| JP | 5 84577 | 11/1993 |
| JP | 10 16660 | 1/1998 |
| JP | 2002 067789 | 3/2002 |
| JP | 2003 306131 | 10/2003 |
| JP | 2008 143455 | 6/2008 |
| JP | 2009 51328 | 3/2009 |

OTHER PUBLICATIONS

International Search Report issued Jul. 7, 2009 in PCT/JP09/057144 filed Apr. 7, 2009.

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

To inhibit the attractiveness of a ceiling material from deteriorating. According to a passenger compartment material structure (10), on a ceiling material (12), there is disposed a water guide portion (34) that guides water (W) flowing on a surface (32A) of an air barrier film (32) on a passenger compartment outer side toward a pillar garnish (14) to the pillar garnish (14). Consequently, even in a case where the water (W) has flowed on the surface 32A of the air barrier film 32 on the passenger compartment outer side toward the pillar garnish 14, this water guide portion (34) guides the water (W) to the pillar garnish 14, so the water (W) can be inhibited from reaching an end (28A) of an upholstery material (28) on the pillar garnish (14) side. Because of this, the water (W) can be inhibited from seeping out to a passenger compartment inner side of the upholstery material (28), so the attractiveness of the ceiling material (12) can be inhibited from deteriorating.

4 Claims, 16 Drawing Sheets

FIG. 1
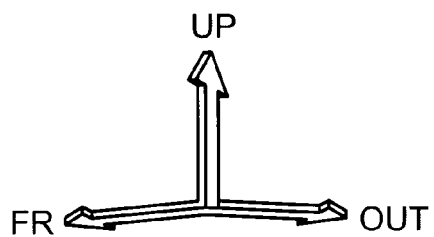
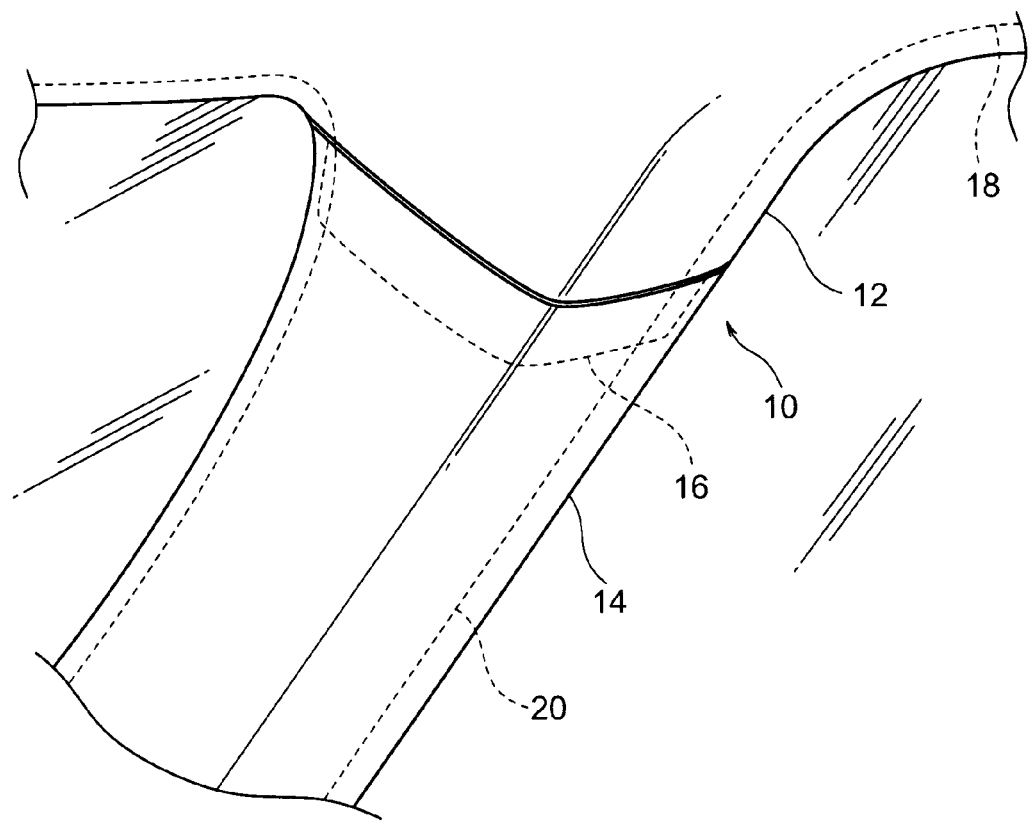

FIG. 2
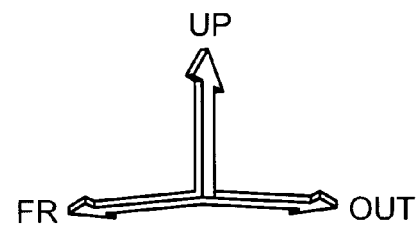
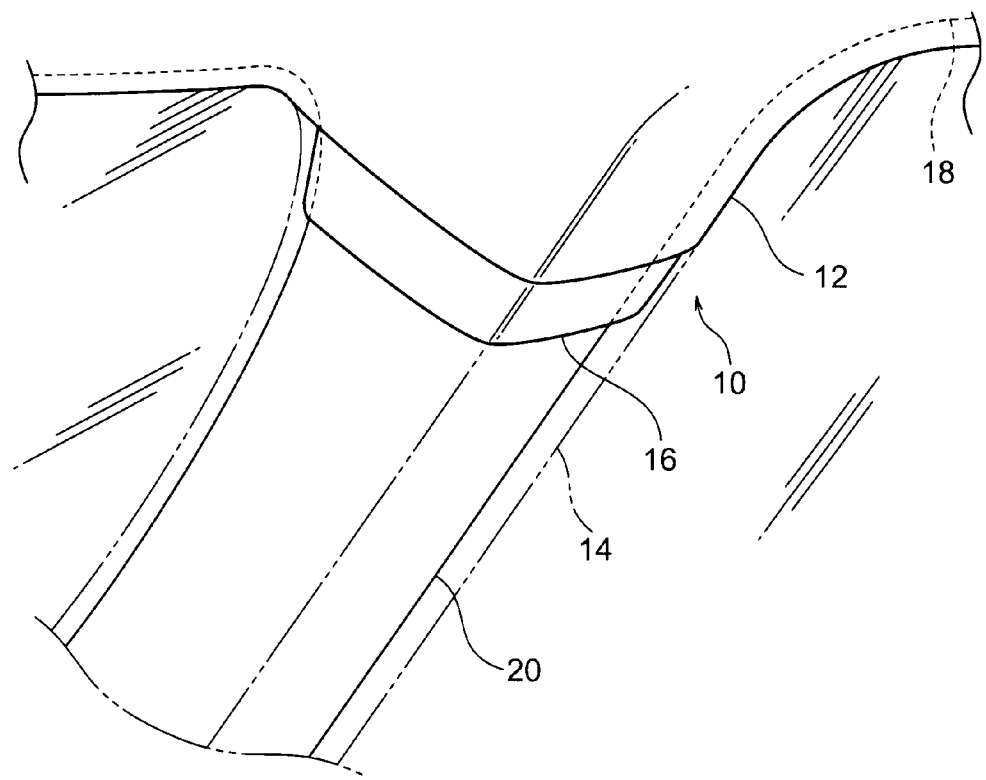

PASSENGER COMPARTMENT MATERIAL STRUCTURE

TECHNICAL FIELD

The present invention relates to a passenger compartment material structure.

BACKGROUND ART

In patent document 1, there is disclosed a ceiling material whose air-impermeability is ensured by a hot melt film.
Patent Document 1: JP-A No. 10-16660
Patent Document 2: JP-A No. 2002-67789
Patent Document 3: JP-A No. 2003-306131

SUMMARY OF INVENTION

Usually, the portion of a ceiling material that is connected to a pillar garnish is set in the lowest position in the ceiling material. For this reason, in a case where dew condensation has formed on the surface of a roof panel on a passenger compartment inner side and water resulting from this dew condensation has dropped onto the ceiling material, this water flows on the ceiling material toward the pillar garnish.

However, at the portion of the ceiling material that is connected to the pillar garnish, in a case where an end of an upholstery material on the pillar garnish side is exposed, there is the potential for the water that has reached the end of this upholstery material to be sucked up in the upholstery material because of, for example, capillary action or the like and for this water that has been sucked up to seep out to the passenger compartment inner side of the upholstery material. In this case, there is the problem that the attractiveness of the ceiling material deteriorates.

The present invention has been made in view of the above-described problem, and it is an object thereof to provide a passenger compartment material structure that can inhibit the attractiveness of a ceiling material from deteriorating.

In order to solve the above-described problem, a passenger compartment material structure pertaining to a first aspect of the present invention includes: a ceiling material that has, in a layered state, an upholstery material and a base material and an air barrier film that are disposed on a passenger compartment outer side with respect to the upholstery material, with the ceiling material covering a roof panel from a passenger compartment inner side; a pillar garnish that is disposed along a lengthwise direction of a pillar that supports the roof panel from an underside of the roof panel, with the pillar garnish covering the pillar from the passenger compartment inner side; and an inhibiting portion that inhibits water flowing on a surface of the air barrier film on the passenger compartment outer side toward the pillar garnish from reaching an end of the upholstery material on the pillar garnish side.

According to this passenger compartment material structure, even in a case where dew condensation has formed on the surface of the roof panel on the passenger compartment inner side, water resulting from this dew condensation has dropped onto the ceiling material, and this water has flowed on the ceiling material toward the pillar garnish, this water can be inhibited by the inhibiting portion from reaching the end of the upholstery material on the pillar garnish side. Because of this, the water can be inhibited from seeping out to the passenger compartment inner side of the upholstery material, so the attractiveness of the ceiling material can be inhibited from deteriorating.

In a passenger compartment material structure pertaining to a second aspect of the present invention, the inhibiting portion is a water guide portion that is disposed separately from or integrally with the air barrier film, and is positioned on the passenger compartment outer side with respect to the pillar garnish, and at least part of which projects to a lower end portion side of the pillar garnish with respect to the end of the upholstery material on the pillar garnish side and overlaps the pillar garnish in the lengthwise direction of the pillar.

According to this passenger compartment material structure, even in a case where the water has flowed on the ceiling material toward the pillar garnish, the water guide portion guides the water to the pillar garnish, so the water can be inhibited from reaching the end of the upholstery material on the pillar garnish side.

In a passenger compartment material structure pertaining to a third aspect of the present invention, the inhibiting portion is a water guide portion that is disposed on the ceiling material and guides the water flowing on the surface of the air barrier film on the passenger compartment outer side toward the pillar garnish to the pillar garnish.

According to this passenger compartment material structure, even in a case where the water has flowed on the ceiling material toward the pillar garnish, the water guide portion guides the water to the pillar garnish, so the water can be inhibited from reaching the end of the upholstery material on the pillar garnish side.

In a passenger compartment material structure pertaining to a fourth aspect of the present invention, the air barrier film is disposed on the passenger compartment outer side with respect to the base material, and the inhibiting portion is a cover member that is formed in a cross-sectional C shape, with the portion of the ceiling material on the pillar garnish side being inserted therein, and that is tightly adhered to at least the air barrier film.

According to this passenger compartment material structure, even in a case where the water has flowed on the ceiling material toward the pillar garnish, the cover member guides the water to the pillar garnish while blocking the water, so the water can be inhibited from reaching the end of the upholstery material on the pillar garnish side.

In a passenger compartment material structure pertaining to a fifth aspect of the present invention, the air barrier film is disposed on the passenger compartment outer side with respect to the base material, and the inhibiting portion is a water absorbing member that is disposed on the surface of the air barrier film on the passenger compartment outer side.

According to this passenger compartment material structure, even in a case where the water has flowed on the ceiling material toward the pillar garnish, the water absorbing member absorbs the water, so the water can be inhibited from reaching the end of the upholstery material on the pillar garnish side.

As described in detail above, according to the present invention, water can be inhibited by the inhibiting portion from reaching the end of the upholstery material on the pillar garnish side. Because of this, the water can be inhibited from seeping out to the passenger compartment inner side of the upholstery material, so the attractiveness of the ceiling material can be inhibited from deteriorating.

BRIEF DESCRIPTION OF THE DRAWINGS

FIG. 1 is a perspective view showing a passenger compartment material structure pertaining to a first embodiment of the present invention as seen from a passenger compartment inner side;

FIG. 2 is a view showing a state in which a pillar garnish has been detached from the passenger compartment material structure shown in FIG. 1;

DESCRIPTION OF EMBODIMENTS

First Embodiment

Figure 3:
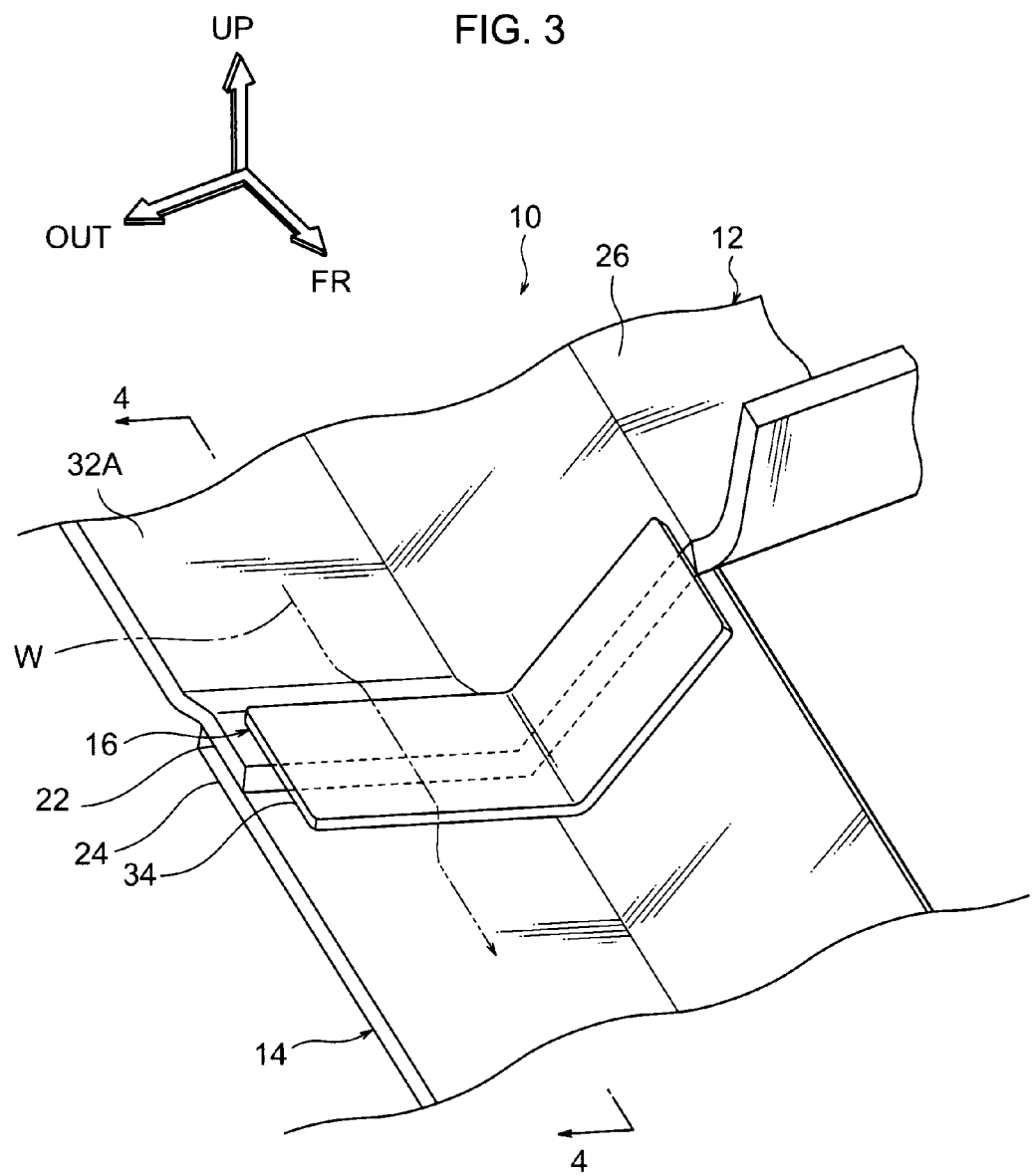
FIG. 3 is a perspective view showing the passenger compartment material structure shown in FIG. 1 as seen from a passenger compartment outer side.

To begin, a first embodiment of the present invention will be described.

As shown in FIG. 1 and FIG. 2, a passenger compartment material structure 10 pertaining to the first embodiment of the present invention is equipped with a ceiling material 12, a pillar garnish 14, and a water guide member 16.

The ceiling material 12 covers a roof panel 18 from a passenger compartment inner side. A front pillar 20 supports the roof panel 18 from an underside of the roof panel 18, and the pillar garnish 14 is disposed along a lengthwise direction of this front pillar 20 and covers this front pillar 20 from the passenger compartment inner side.

Figure 4:
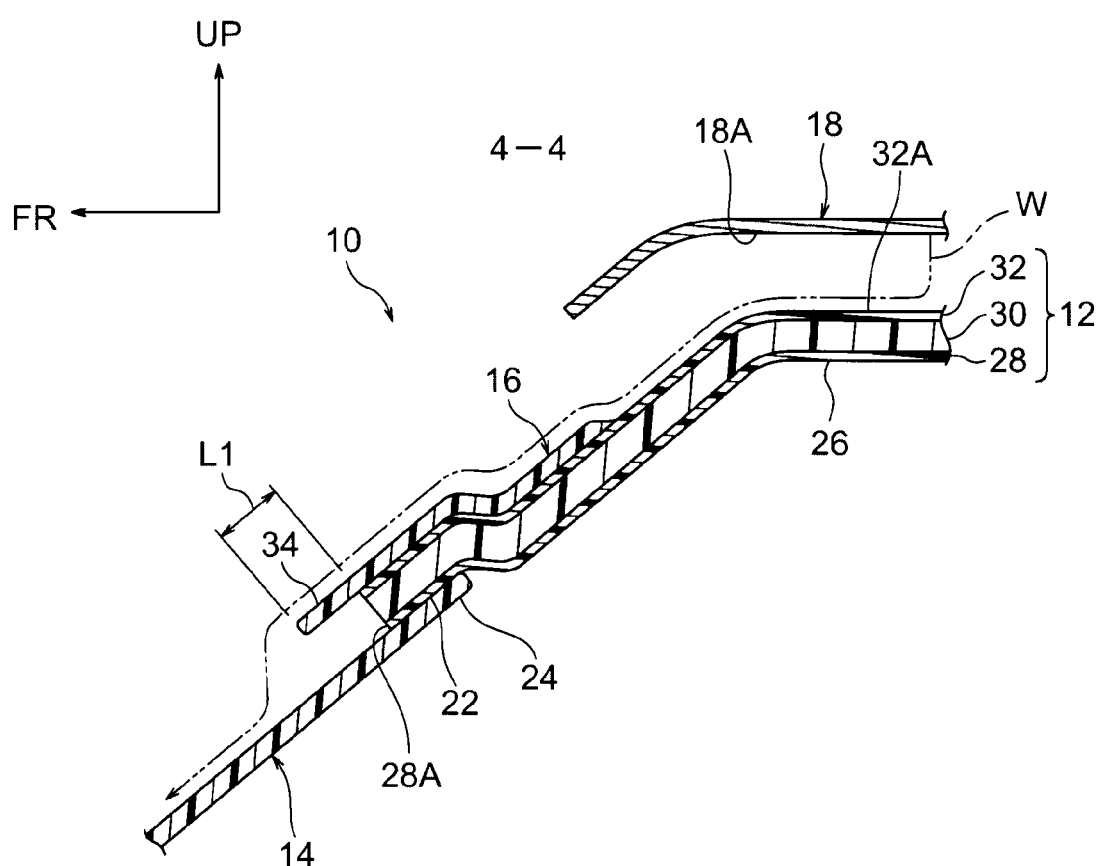
FIG. 4 is a cross-sectional view taken along line 4-4 in FIG. 3.

As shown in FIG. 3 and FIG. 4, a connecting portion 22 is formed on the pillar garnish 14 side of the ceiling material 12, and a connecting portion 24 is formed on the ceiling material 12 side of the pillar garnish 14. The connecting portion 24 is positioned on the passenger compartment inner side with respect to the connecting portion 22 and is superimposed on the connecting portion 22. Further, the connecting portions 22 and 24 are positioned lower than a main body portion 26 of the ceiling material 12.

As shown in FIG. 4, the ceiling material 12 has, in a layered state, an upholstery material 28, a base material 30, and an air barrier film 32. The base material 30 is disposed on a passenger compartment outer side with respect to the upholstery material 28, and the air barrier film 32 is disposed on the passenger compartment outer side with respect to the base material 30.

The base material 30 is configured by, for example, a heat insulating material such as rigid urethane foam, and the upholstery material 28 is configured by, for example, a non-woven fabric, a knit, a fabric, or the like. Further, the air barrier film 32 is configured by, for example, resin, paper, or the like.

The water guide member 16 is configured separately from the air barrier film 32 and is adhered in a state of tight adhesion to a surface 32A of this air barrier film 32 on the passenger compartment outer side. This water guide member 16 is positioned on the passenger compartment outer side with respect to the pillar garnish 14 and has a water guide portion 34 serving as an inhibiting portion.

The water guide portion 34 projects to a lower end portion side of the pillar garnish 14 with respect to an end 28A of the upholstery material 28 on the pillar garnish 14 side and overlaps this pillar garnish 14 in the lengthwise direction of the front pillar 20. That is, the overlap length (projecting length) of this water guide portion 34 is a length L1.

The water guide member 16 is formed by resin molding or is configured to have flexibility, and the water guide member 16 follows the shape of the connecting portion 20 and is disposed integrally with this connecting portion 22.

Next, the action and effects of the first embodiment of the present invention will be described.

Figure 16:
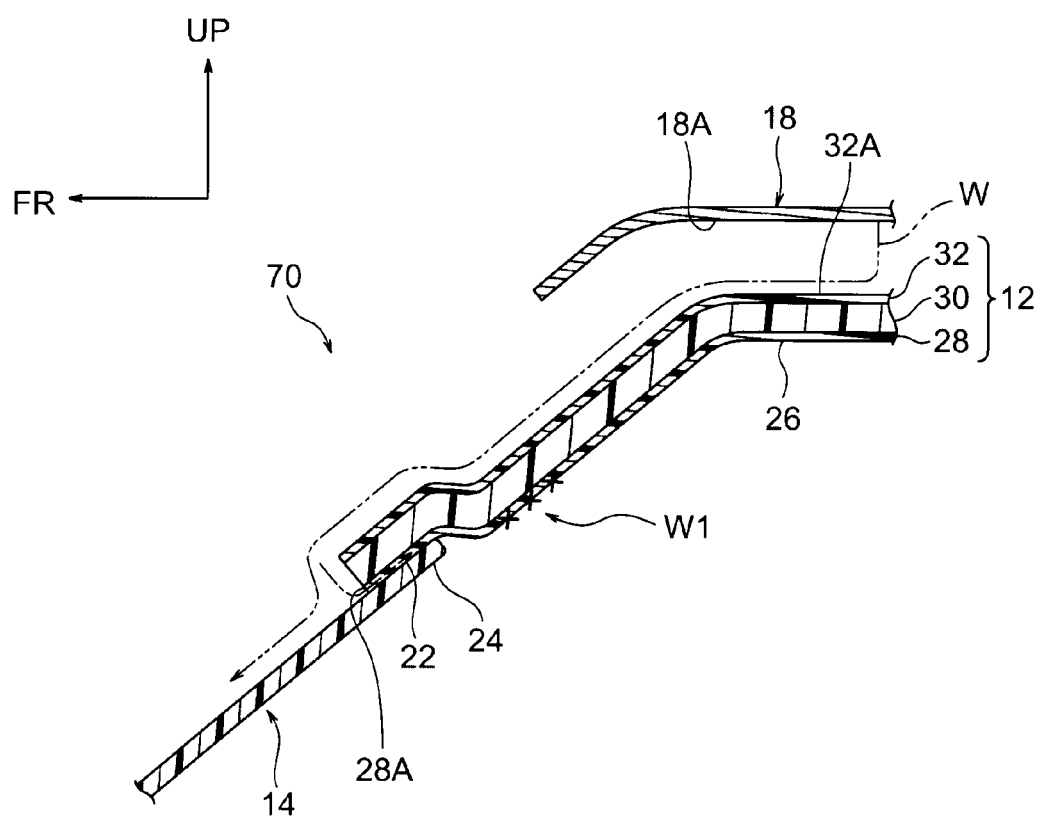
FIG. 16 is a cross-sectional view of a passenger compartment material structure pertaining to a comparative example.

First, in order to make the action and effects of the first embodiment of the present invention clearer, a comparative example will be described. A passenger compartment material structure 70 pertaining to a comparative example shown in FIG. 16 is given a configuration where the water guide member 16 is omitted with respect to the passenger compartment material structure 10 pertaining to the first embodiment of the present invention.

In the passenger compartment material structure 70 pertaining to this comparative example, in a case where dew condensation has formed on a surface 18A of the roof panel 18 on the passenger compartment inner side and water W resulting from this dew condensation has dropped onto the ceiling material 12, this water flows on the surface 32A of the air barrier film 32 on the passenger compartment outer side toward the pillar garnish 14.

However, at the connecting portion 22, the end 28A of the upholstery material 28 on the pillar garnish 14 side is exposed. For this reason, there is the potential for the water W that has reached the end 28A of this upholstery material 28 to be sucked up in the upholstery material 28 because of, for example, capillary action or the like and for this water W that has been sucked up to seep out to the passenger compartment inner side of the upholstery material 28 (there is the potential for seeping water W1 of the water to form). In this case, there is the problem that the attractiveness of the ceiling material 12 deteriorates.

In contrast, according to the passenger compartment material structure 10 pertaining to the first embodiment of the present invention, as shown in FIG. 4, even in a case where the water W has flowed on the surface 32A of the air barrier film 32 on the passenger compartment outer side toward the pillar garnish 14, the water guide portion 34 guides the water W to the pillar garnish 14, so the water W can be inhibited from reaching the end 28A of the upholstery material 28 on the pillar garnish 14 side. Because of this, the water W can be inhibited from seeping out to the passenger compartment inner side of the upholstery material 28, so the attractiveness of the ceiling material 12 can be inhibited from deteriorating.

Figure 5:
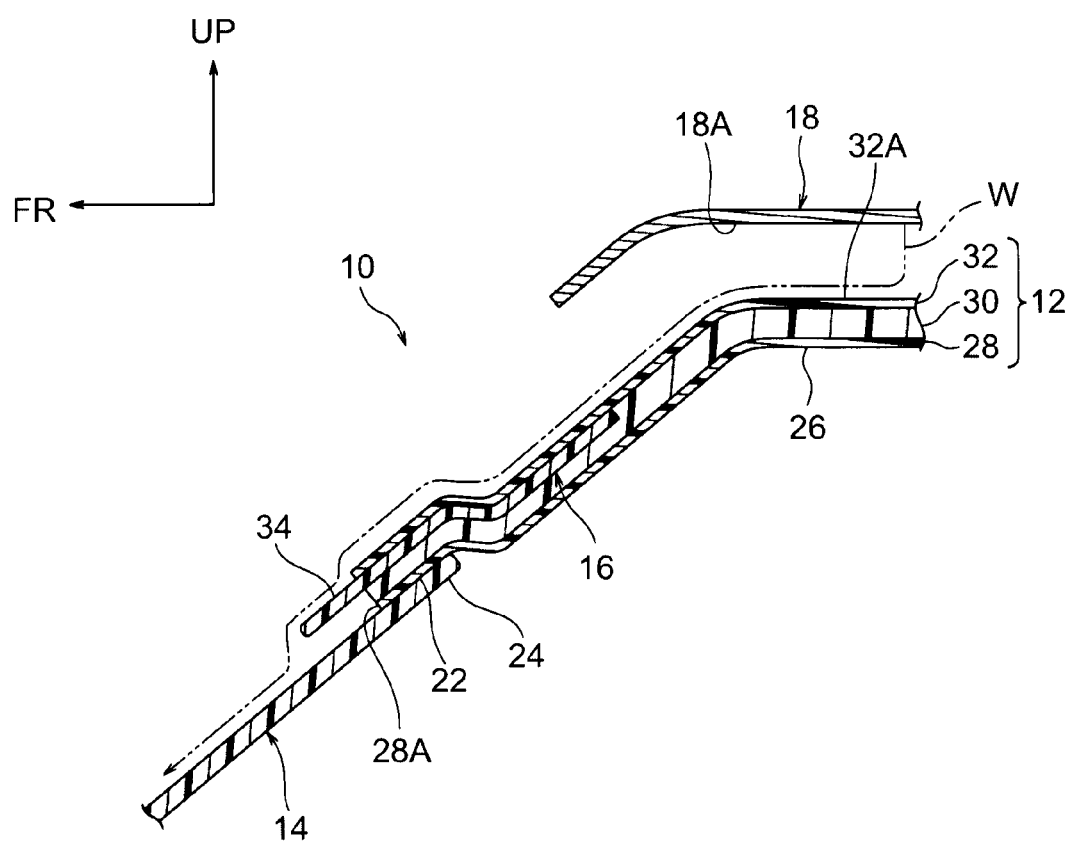
FIG. 5 is a view showing a modification of the passenger compartment material structure shown in FIG. 4.

In the present embodiment, the water guide member 16 is disposed on the passenger compartment outer side with respect to the air barrier film 32, but as shown in FIG. 5 the water guide member 16 may also be disposed between the base material 30 and the air barrier film 32.

Figure 6:
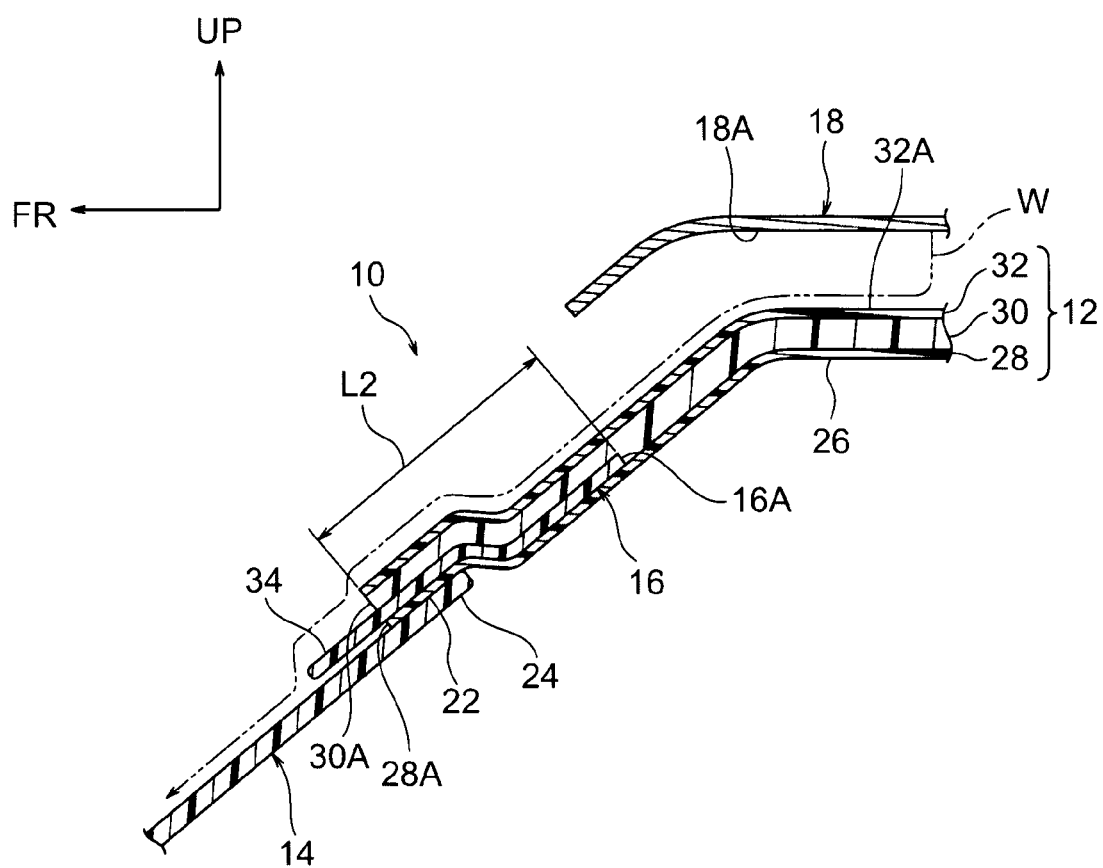
FIG. 6 is a view showing a modification of the passenger compartment material structure shown in FIG. 4.

Further, as shown in FIG. 6, the water guide member 16 may also be disposed between the base material 30 and the upholstery material 28. In this case, when a long overlap length L2 between the water guide member 16 and the upholstery material 28 is ensured, the water W can be inhibited from traveling from an end 30A of the base material 30 through the inside of the base material 30 and reaching the upholstery material 28 from an upper end 16A side of the water guide member 16, so this is preferred.

Figure 7:
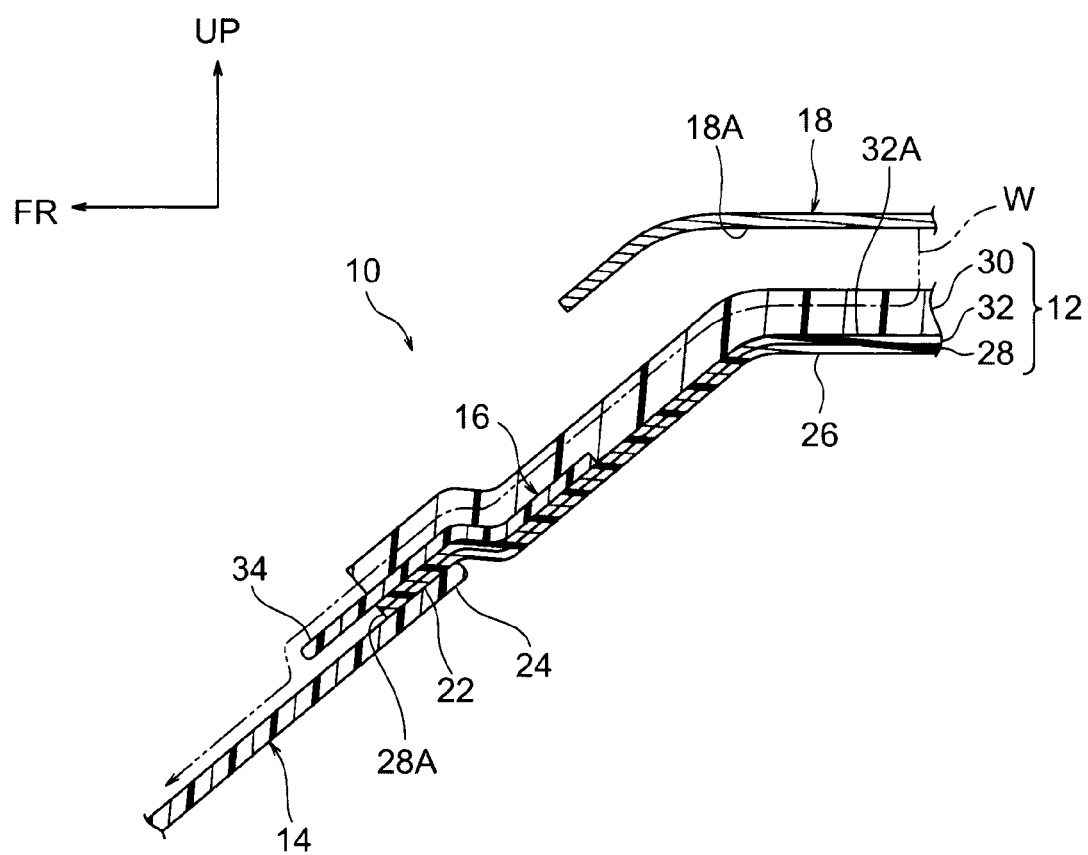
FIG. 7 is a view showing a modification of the passenger compartment material structure shown in FIG. 4.
Figure 8:
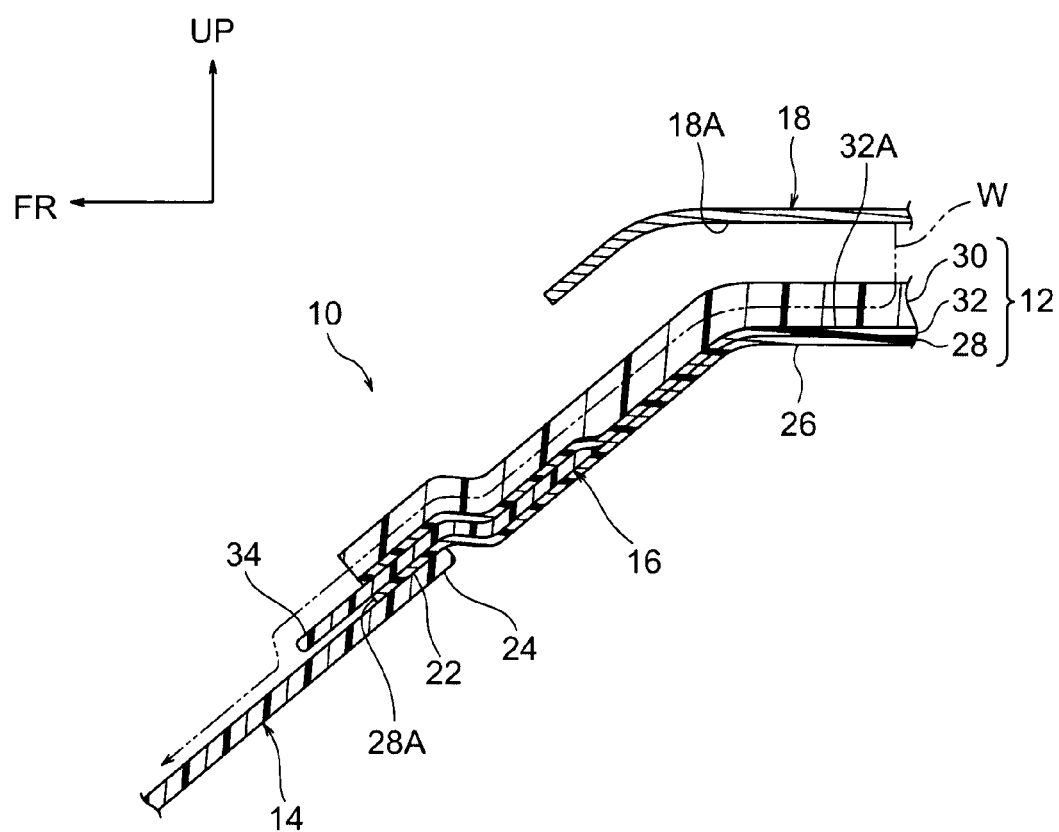
FIG. 8 is a view showing a modification of the passenger compartment material structure shown in FIG. 4.

Further, in the present embodiment, the air barrier film 32 is disposed on the passenger compartment outer side with respect to the base material 30, but as shown in FIG. 7 and FIG. 8 the air barrier film 32 may also be disposed between the base material 30 and the upholstery material 28.

Further, in this case, the water guide member 16 may be disposed between the base material 30 and the air barrier film 32 as shown in FIG. 7 or may be disposed between the air barrier film 32 and the upholstery material 28 as shown in FIG. 8.

According to the above modifications also, the water guide member 34 guides the water W to the pillar garnish 14, so the water W can be inhibited from reaching the end 28A of the upholstery material 28 on the pillar garnish 14 side.

Further, in the above-described embodiment, the distal end side of the water guide portion 34 is away from the pillar garnish 14, but the water guide portion 34 may be configured to have flexibility overall so that its distal end side deforms toward the pillar garnish 14 side because of self-weight and contacts this pillar garnish 14.

Second Embodiment

Next, a second embodiment of the present invention will be described.

Figure 9:
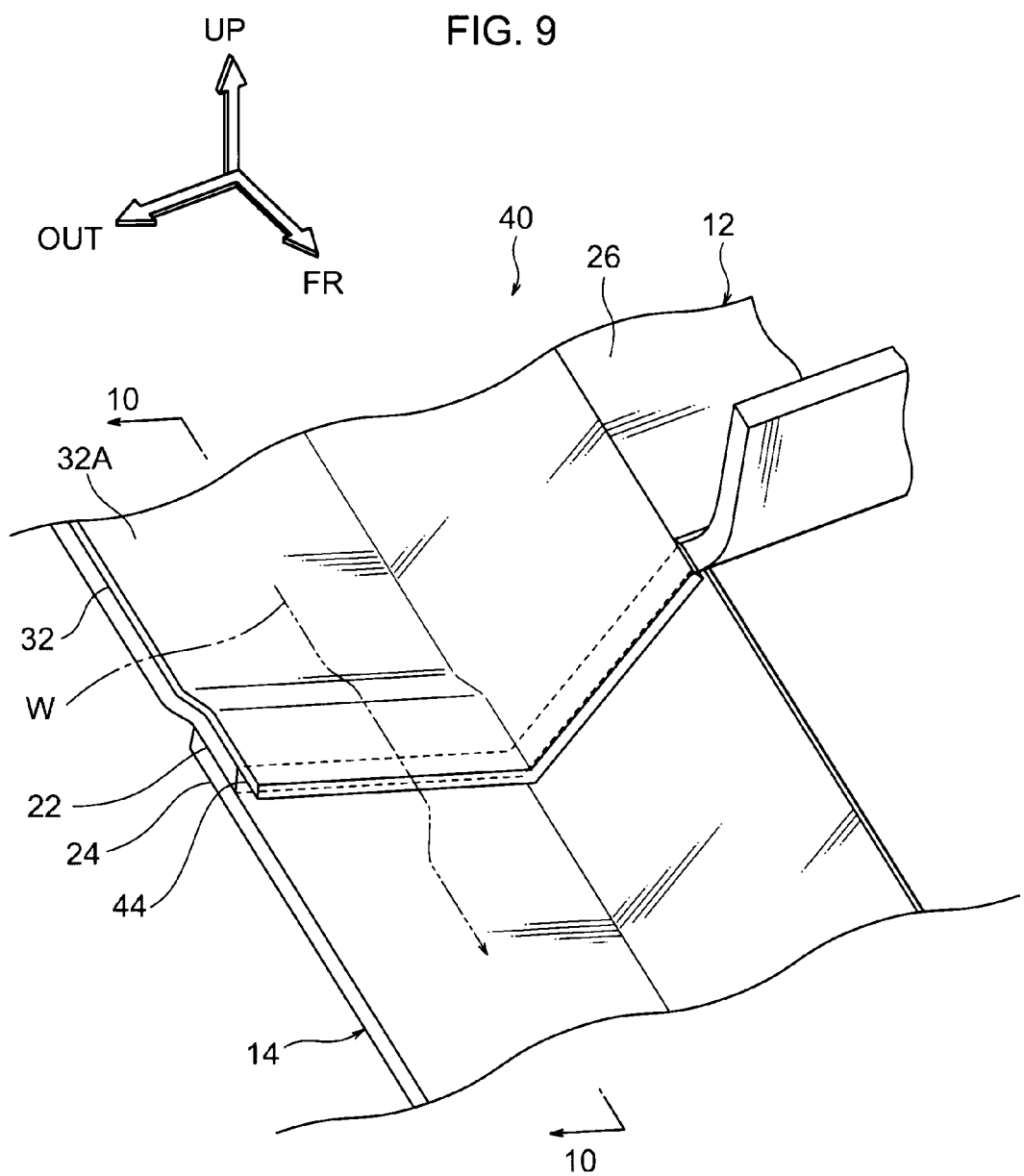
FIG. 9 is a perspective view showing a passenger compartment material structure pertaining to a second embodiment of the present invention as seen from the passenger compartment outer side.
Figure 10:
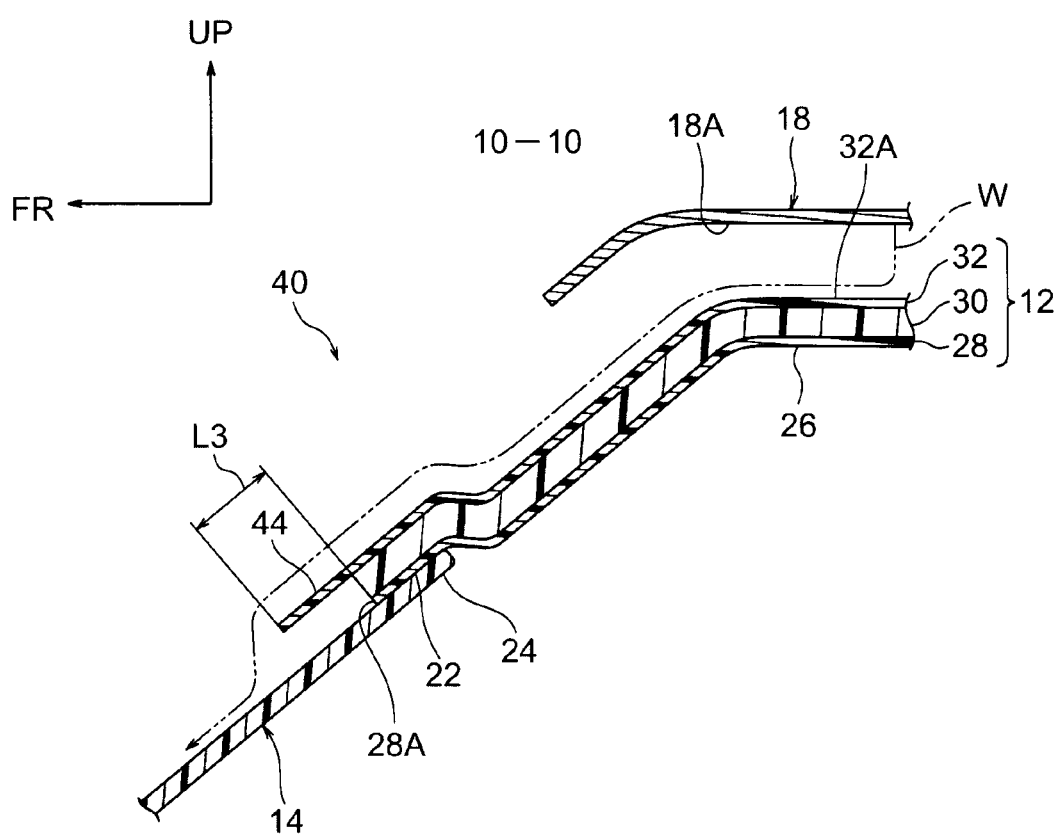
FIG. 10 is a cross-sectional view taken along line 10-10 in FIG. 9.

A passenger compartment material structure 40 pertaining to the second embodiment of the present invention shown in FIG. 9 and FIG. 10 is one in which the water guide member 16 is omitted with respect to the passenger compartment material structure 10 pertaining to the first embodiment of the present invention described above and is given the following configuration.

That is, the portion of the air barrier film 32 on the pillar garnish 14 side extends (projects) to the lower end portion side of the pillar garnish 14 with respect to the end 28A of the upholstery material 28 on the pillar garnish 14 side, and this extension portion is a water guide portion 44 serving as an inhibiting portion (that is, the water guide portion 44 is disposed integrally with the air barrier film 32).

Further, the water guide portion 44 overlaps the pillar garnish 14 in the lengthwise direction of the front pillar 20. That is, the overlap length (projecting length) of this water guide portion 44 is a length L3.

According to this configuration also, as shown in FIG. 10, in a case where the water W has flowed on the surface 32A of the air barrier film 32 on the passenger compartment outer side toward the pillar garnish 14, the water guide portion 44 guides the water W to the pillar garnish 14, so the water W can be inhibited from reaching the end 28A of the upholstery material 28 on the pillar garnish 14 side. Because of this, the water W can be inhibited from seeping out to the passenger compartment inner side of the upholstery material 28, so the attractiveness of the ceiling material 12 can be inhibited from deteriorating.

Figure 11:
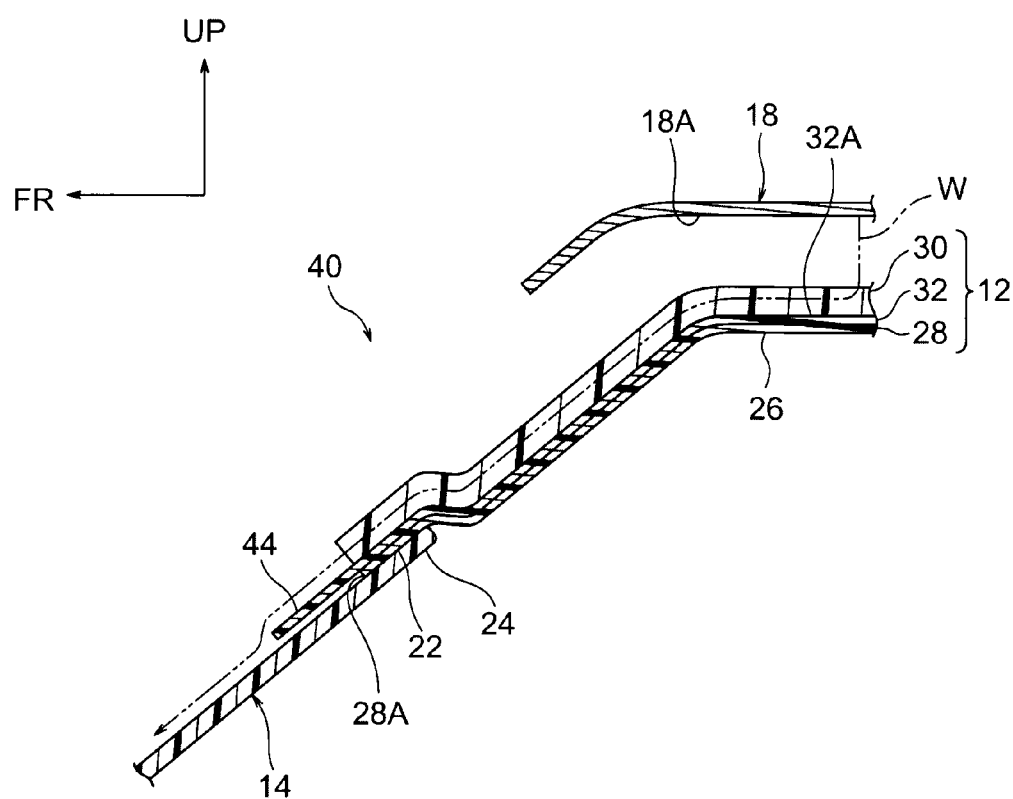
FIG. 11 is a view showing a modification of the passenger compartment material structure shown in FIG. 10.

In the present embodiment, the air barrier film 32 that has the water guide portion 44 is disposed on the passenger compartment outer side with respect to the base material 30, but as shown in FIG. 11 the air barrier film 32 may also be disposed between the base material 30 and the upholstery material 28.

According to this modification also, the water guide portion 44 guides the water W to the pillar garnish 14, so the water W can be inhibited from reaching the end 28A of the upholstery material 28 on the pillar garnish 14 side.

Third Embodiment

Next, a third embodiment of the present invention will be described.

Figure 12:
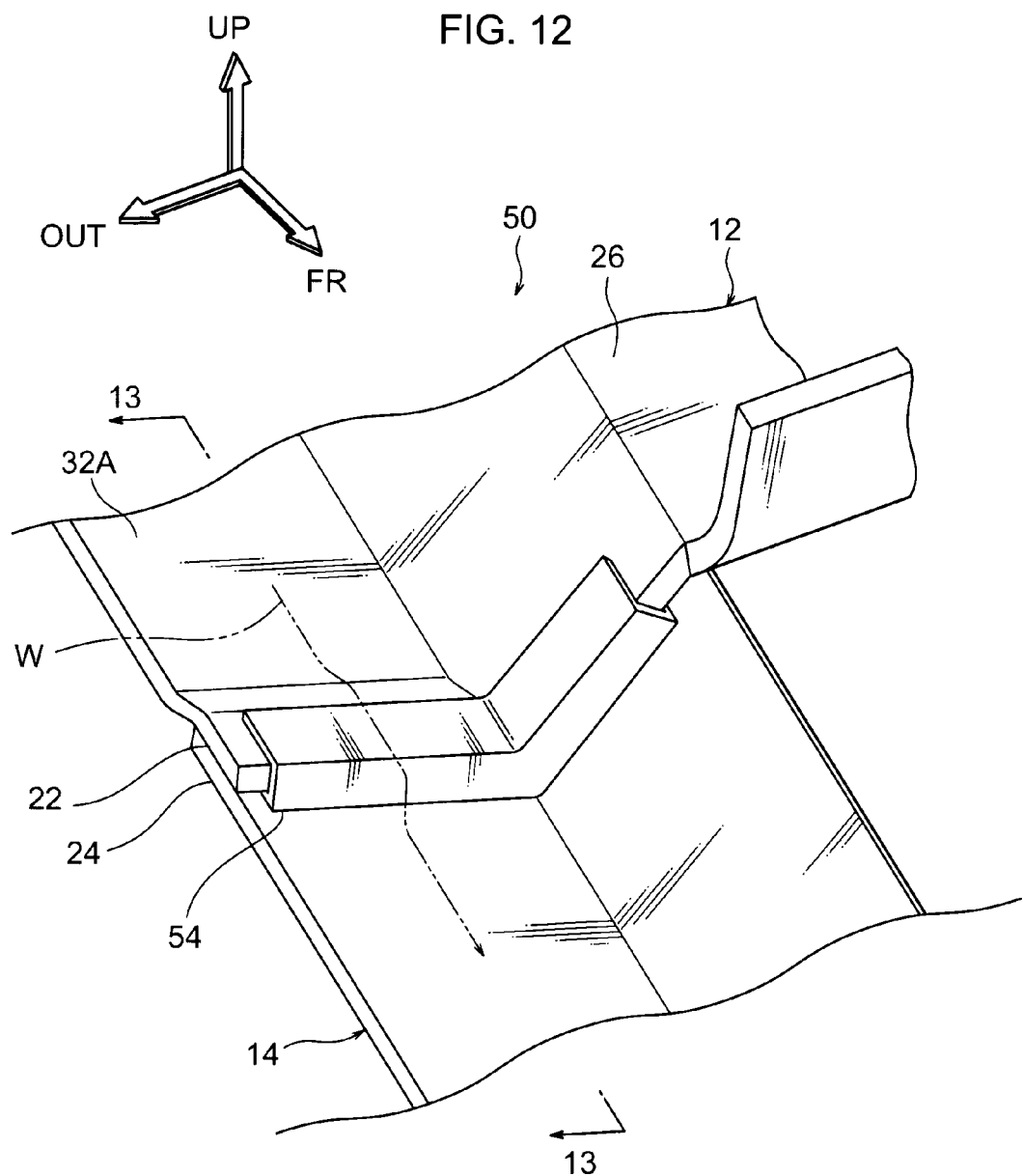
FIG. 12 is a perspective view showing a passenger compartment material structure pertaining to a third embodiment of the present invention as seen from the passenger compartment outer side.
Figure 13:
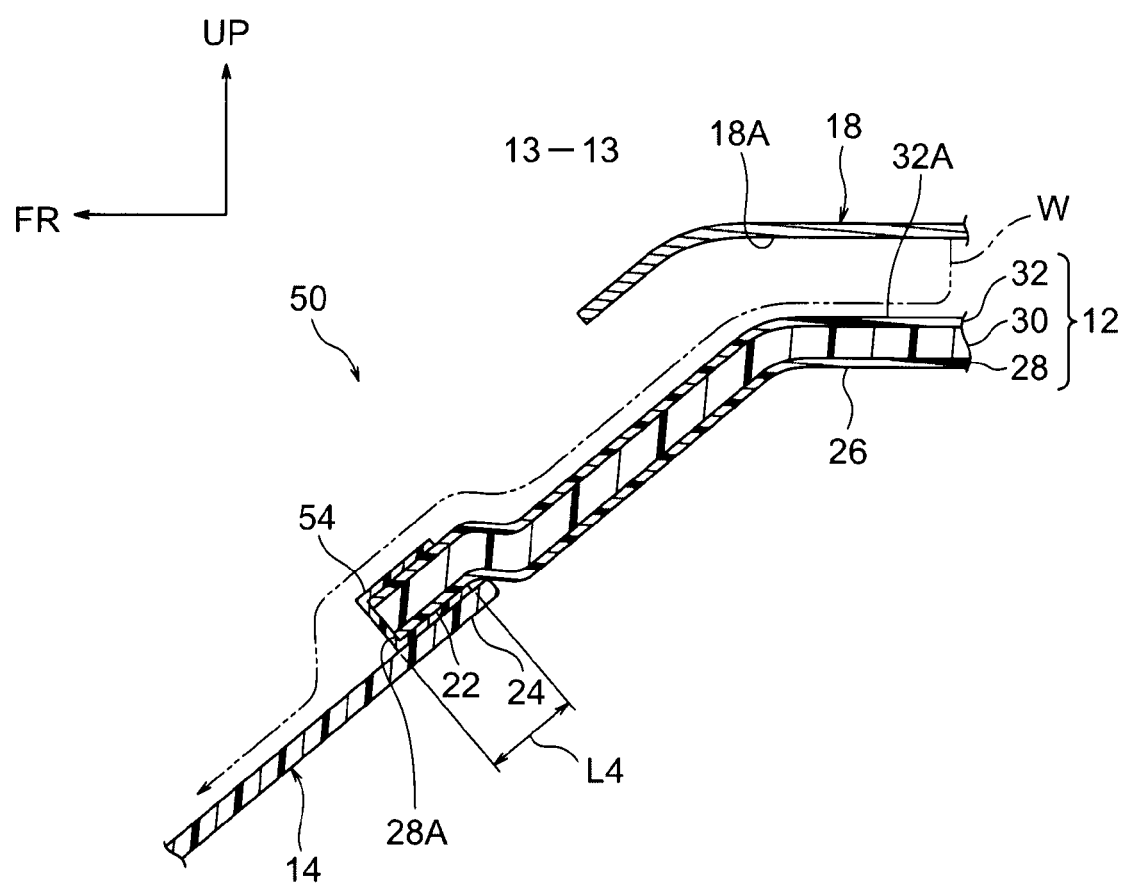
FIG. 13 is a cross-sectional view taken along line 13-13 in FIG. 12.

A passenger compartment material structure 50 pertaining to the third embodiment of the present invention shown in FIG. 12 and FIG. 13 is one in which a cover member 54 serving as an inhibiting portion is used instead of the water guide member 16 with respect to the passenger compartment material structure 10 pertaining to the first embodiment of the present invention described above.

The cover member 54 is configured by, for example, a resin molded product, a film, or the like and has preventiveness. This cover member 54 is formed in a cross-sectional C shape, and the connecting portion 22 of the ceiling material 12 (the portion of the ceiling material 12 on the pillar garnish 14 side) is inserted inside this cover member 54.

Further, this cover member 54 is tightly adhered to the air barrier film 32. Moreover, the overlap length between the cover member 54 and the upholstery material 28 is a length L4.

According to this configuration, even in a case where the water W has flowed on the surface 32A of the air barrier film 32 on the passenger compartment outer side toward the pillar garnish 14, the cover member 54 guides the water to the pillar garnish 14 while blocking the water, so the water W can be inhibited from reaching the end 28A of the upholstery material 28 on the pillar garnish 14 side. Because of this, the water W can be inhibited from seeping out to the passenger compartment inner side of the upholstery material 28, so the attractiveness of the ceiling material 12 can be inhibited from deteriorating.

Further, the connecting portion 22 of the ceiling material 12 is inserted into the cover member 54, whereby the connecting portion 22 of this ceiling material 12 can be protected.

The cover member 54 may also be tightly adhered to the upholstery material 28 in addition to the air barrier film 32. By doing this, the cover member 54 becomes fitted together with the connecting portion 22 of the ceiling material 12, so the connecting portion 22 of this ceiling material 12 can be reinforced.

Fourth Embodiment

Next, a fourth embodiment of the present invention will be described.

Figure 14:
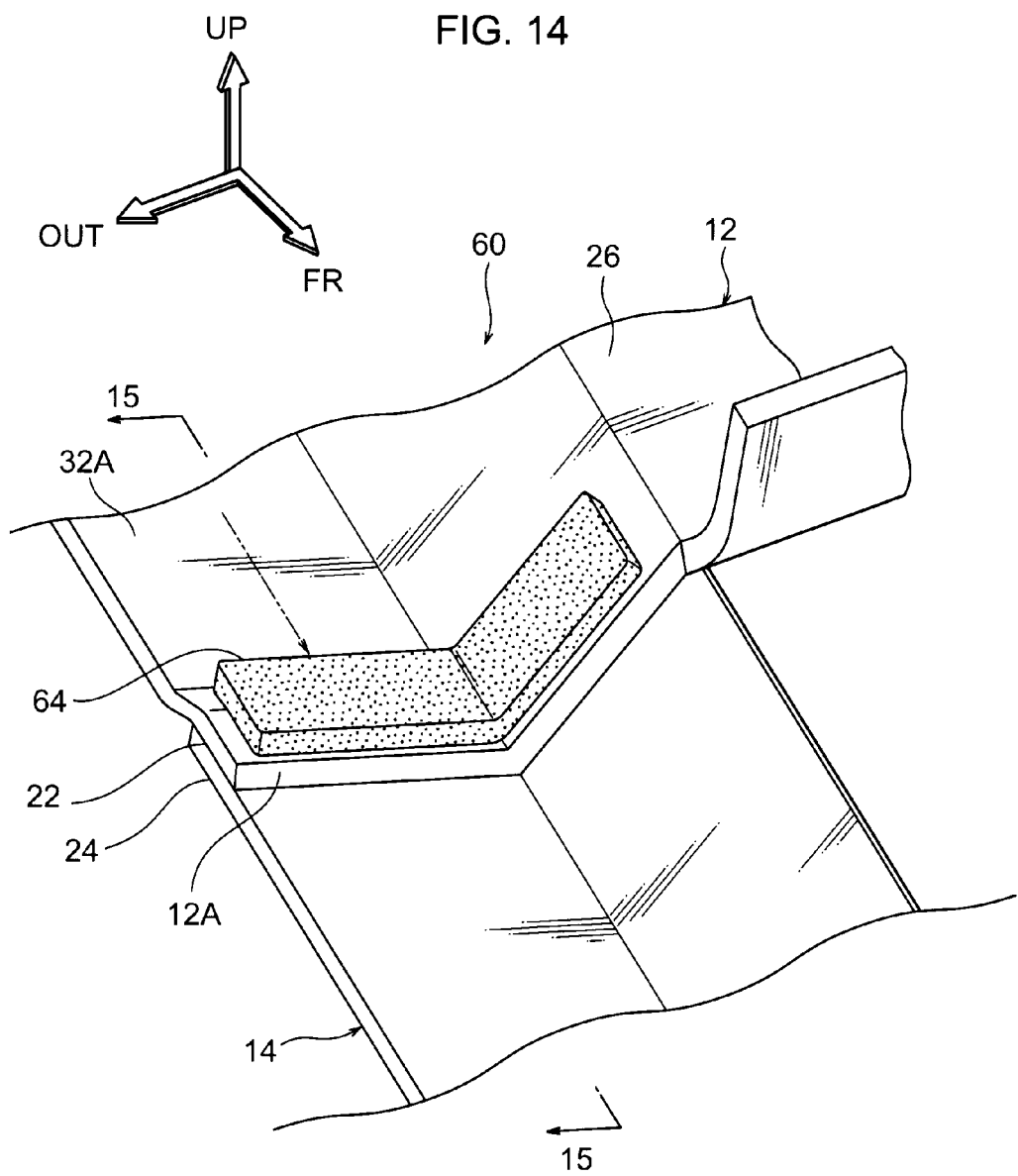
FIG. 14 a perspective view showing a passenger compartment material structure pertaining to a fourth embodiment of the present invention as seen from the passenger compartment outer side.
Figure 15:
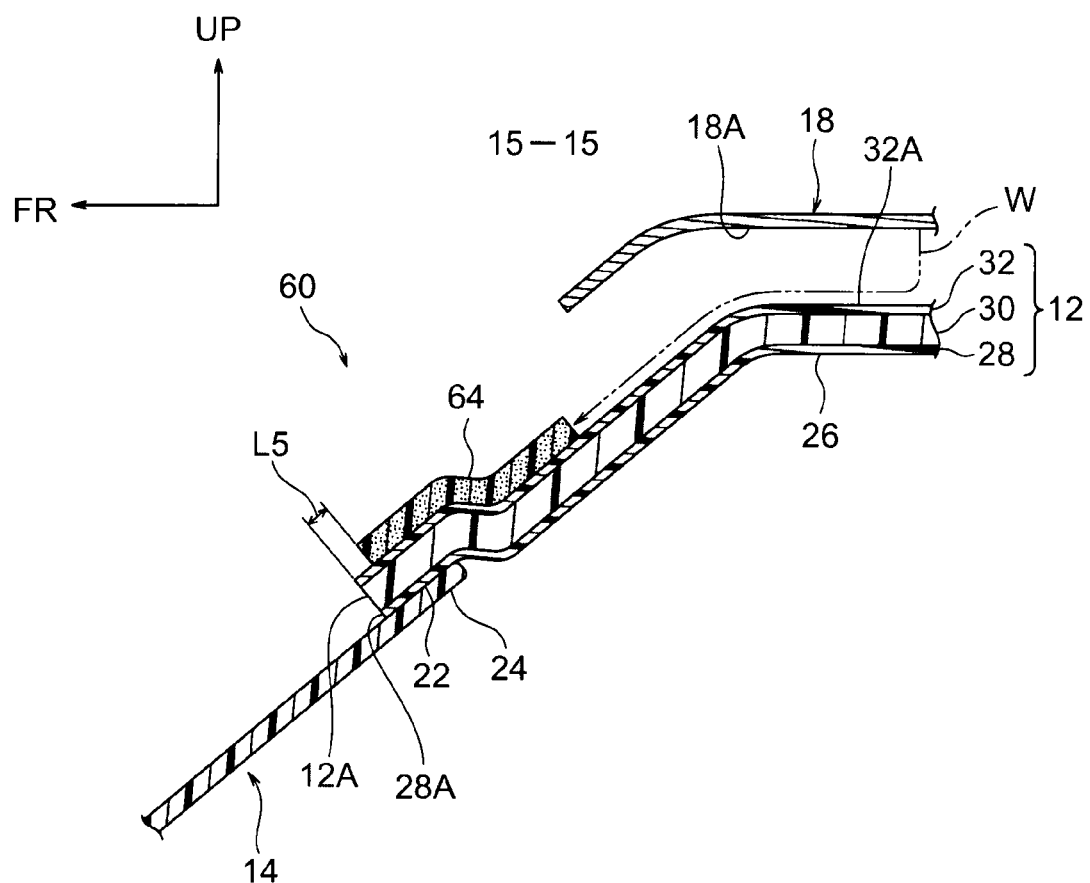
FIG. 15 is a cross-sectional view taken along line 15-15 in FIG. 14.

A passenger compartment material structure 60 pertaining to the fourth embodiment of the present invention shown in FIG. 14 and FIG. 15 is one in which a water absorbing member 64 serving as an inhibiting portion is used instead of the water guide member 16 with respect to the passenger compartment material structure 10 pertaining to the first embodiment of the present invention described above.

The water absorbing member 64 is configured by, for example, by a sponge, a nonwoven fabric, or the like and is disposed on the surface 32A of the air barrier film 32 on the passenger compartment outer side. Further, the water absorbing member 64 is spaced a length L5 with respect to the end 12A of the ceiling material 12 on the pillar garnish 14 side and has a volume sufficient enough to be able to absorb a quantity of water assumed beforehand.

According to this configuration, even in a case where the water W has flowed on the surface 32A of the air barrier film 32 on the passenger compartment outer side toward the pillar garnish 14, the water absorbing member 64 absorbs the water, so the water W can be inhibited from reaching the end 28A of the upholstery material 28 on the pillar garnish 14 side. Because of this, the water W can be inhibited from seeping out to the passenger compartment inner side of the upholstery material 28, so the attractiveness of the ceiling material 12 can be inhibited from deteriorating.

Embodiments of the present invention and modifications thereof have been described above, but the present invention is not limited to the above description and is of course capable of being modified and implemented in a variety of ways other than what has been described above in a range not departing from the gist thereof.

Further, in each of the embodiments described above, the passenger compartment material structures 10, 40, 50, and 60 are applied in regard to the ceiling material 12 and the pillar garnish 14 that covers the front pillar 20, but they may also be applied in regard to the ceiling material 12 and a pillar garnish that covers another pillar (e.g., a center pillar, a rear pillar, etc.).

The invention claimed is:

1. A passenger compartment material structure comprising:
   a ceiling material that has, in a layered state, an upholstery material, and a base material and an air barrier film that are disposed on a passenger compartment outer side with respect to the upholstery material, the ceiling material covering a roof panel from a passenger compartment inner side;
   a pillar garnish that is disposed along a lengthwise direction of a pillar that supports the roof panel from an underside of the roof panel, the pillar garnish covering the pillar from the passenger compartment inner side; and
   a water guide portion that is disposed separately from or integrally with the air barrier film, is positioned on the passenger compartment outer side with respect to the pillar garnish, projects to a lower end portion side of the pillar garnish with respect to an end of the upholstery material on the pillar garnish side, and overlaps the pillar garnish in the lengthwise direction of the pillar.

2. A passenger compartment material structure comprising:
   a ceiling material that has, in a layered state, an upholstery material, a base material that is disposed on a passenger compartment outer side with respect to the upholstery material, and an air barrier film that is disposed on the passenger compartment outer side with respect to the base material, the ceiling material covering a roof panel from a passenger compartment inner side;
   a pillar garnish that is disposed along a lengthwise direction of a pillar that supports the roof panel from an underside of the roof panel, the pillar garnish covering the pillar from the passenger compartment inner side; and
   a water guide member that is disposed between the base material and the upholstery material,
   wherein the water guide member has a water guide portion that is positioned on the passenger compartment outer side with respect to the pillar garnish, projects to a lower end portion side of the pillar garnish with respect to an end of the upholstery material on the pillar garnish side, and overlaps the pillar garnish in the lengthwise direction of the pillar.

3. The passenger compartment material structure according to claim 1,
   wherein the water guide portion is disposed only on the air barrier film.

4. The passenger compartment material structure according to claim 3,
   wherein the water guide portion extends from an end of the air barrier film toward the lower end portion side of the pillar garnish in the lengthwise direction of the pillar.

* * * * *